(12) United States Patent
Paila Ram et al.

(10) Patent No.: US 12,717,483 B2
(45) Date of Patent: Aug. 25, 2026

(54) POWER STATE TRANSITION WITH FLASH MEMORY SYSTEM

(71) Applicant: QUALCOMM Incorporated, San Diego, CA (US)

(72) Inventors: Kaustub Naidu Paila Ram, Hyderabad (IN); Rajesh Kumar Biswal, Puri (IN); Madhu Yashwanth Boenapalli, Hyderabad (IN); Manmeet Singh Ahluwalia, Bangalore (IN); Surendra Paravada, Hyderabad (IN); Sai Praneeth Sreeram, Anantapur (IN)

(73) Assignee: Qualcomm Incorporated, San Diego, CA (US)

(*) Notice: Subject to any disclaimer, the term of this patent is extended or adjusted under 35 U.S.C. 154(b) by 63 days.

(21) Appl. No.: 18/653,675

(22) Filed: May 2, 2024

(65) Prior Publication Data

US 2025/0341966 A1 Nov. 6, 2025

(51) Int. Cl.
*G06F 3/06* (2006.01)

(52) U.S. Cl.
CPC .......... *G06F 3/0611* (2013.01); *G06F 3/0634* (2013.01); *G06F 3/0679* (2013.01)

(58) Field of Classification Search
CPC .... G06F 3/0634; G06F 3/0625; G06F 3/0679; G06F 3/0604; G06F 1/3203; G06F 1/3206; G06F 1/3268; G06F 1/325
See application file for complete search history.

(56) References Cited

U.S. PATENT DOCUMENTS

| | | | | |
|---|---|---|---|---|
| 11,181,964 | B2 * | 11/2021 | Park | G06F 1/3225 |
| 2020/0166985 | A1 * | 5/2020 | He | G06F 1/3293 |
| 2022/0350535 | A1 * | 11/2022 | Song | G06F 1/3275 |
| 2023/0161494 | A1 * | 5/2023 | Benisty | G06F 3/0647 711/103 |
| 2023/0350585 | A1 * | 11/2023 | Zhao | G06F 3/0679 |
| 2025/0076959 | A1 * | 3/2025 | Vaysman | G06F 1/3225 |

OTHER PUBLICATIONS

R. Khamamkar and A. Keswani, "Analyzing Power Management in Non-Volatile Memory Express (NVMe) Solid State Drives," 2019 IEEE Pune Section International Conference (PuneCon), Pune, India, 2019, pp. 1-4, doi: 10.1109/PuneCon46936.2019.9105679. (Year: 2019).*

* cited by examiner

*Primary Examiner* — Curtis James Kortman
(74) *Attorney, Agent, or Firm* — Norton, Rose, Fulbright, US LLP

(57) ABSTRACT

This disclosure provides systems, methods, and devices for memory systems that support improved power state transition. In a first aspect, a method of accessing data in a flash memory system includes a controller configured to perform operations including: determining a power state transition of the memory system to a non-operational power state; determining, after determining the power state transition, whether a current power state is a higher-power state than a threshold power state; and transmitting, after determining the current power state is the higher-power state than the threshold power state, a first command to the memory system to transition to the threshold power state before the memory system transitions to the non-operational power state. Other aspects and features are also claimed and described.

17 Claims, 6 Drawing Sheets

POWER STATE TRANSITION WITH FLASH MEMORY SYSTEM

TECHNICAL FIELD

Aspects of the present disclosure relate generally to an apparatus and method for controlling a memory device. Some aspects may, more particularly, relate to an apparatus and method for controlling operations for power state transition.

INTRODUCTION

As the value and use of information continues to increase, individuals and businesses seek additional ways to process and store information. In addition, the use of information in various locations and desired portability of information is increasing. For this reason, users are increasingly turning towards the use of portable electronic devices, such as mobile phones, digital cameras, laptop computers and the like. Portable electronic devices generally employ a memory system using a memory device for storing data. A memory system may be used as a main memory or an auxiliary memory of a portable electronic device.

The memory device of the memory system may include one kind or a combination of kinds of storage. For example, magnetic-based memory systems, such as hard disk drives (HDDs), store data by encoding data as a combination of small magnets. As another example, optical-based memory systems, such as digital versatile discs (DVDs) and Blu-ray media, store data by encoding data as physical bits that cause different reflections when illuminated by a light source. As a further example, electronic memory devices store data as collections of electrons that can be detected through voltage and/or current measurements.

Electronic memory devices can be advantageous in certain systems in that they may access data quickly and consume a small amount of power. Examples of an electronic memory device having these advantages include universal serial bus (USB) memory devices (sometimes referred to as "memory sticks"), a memory card (such as used in some cameras and gaming systems), and solid state drive (SSDs) (such as used in laptop computers). NAND flash memory is one kind of memory device that may be used in electronic memory devices. NAND flash memory is manufactured into memory cards or flash disks. Example memory cards include compact flash (CF) cards, multimedia cards (eMMCs), smart media (SM) cards, and secure digital (SD) cards.

A memory system may, in some cases, be integrated with or otherwise connected to a host device, such as an electronic device. For example, memory systems may be integrated with host devices in a system on chip (SoC). As one particular example, a flash memory system, which may be a universal flash storage (UFS) memory system, may be integrated into an electronic device, such as an access point (AP), station (STA), user equipment (UE), base station, modem, camera, automobile, or other system.

Example standards for organization and operation of electronic memory devices is defined in the non-volatile memory specification (e.g., a NVM Express® specification) or the universal flash storage specification. The specification defines how a host software or controller communicates with a non-volatile memory device across multiple transports. The specification provides support for multiple power states that enable high-speed data transfer rates, low latency, and long battery life. The specification specifies many parameters for structuring, reading data from, and writing data to standard-compliant memory devices. For example, standard-compliant devices may include digital cameras, mobile phones, consumer electronic devices, and other devices with internal memory capacity. Standard-compliant memory may include memory embedded within electronic devices and removable memory cards, and memory devices may implement NAND flash memory.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of this disclosure provide for operations and data structures used in operations for improved power state transition. A memory controller efficiently manages the power state transition of the memory system to reduce the total latency when the memory system exits a non-operational power state. For example, when the memory system enters the non-operational power state, the current or most recent power state may be a higher-power state, which takes a long time to exit. The transition time from any one of the memory system's power states to another of the power states are different, such that for certain transitions there may be a smaller total latency to transition to an intermediate power state before transitioning to the final power state from the non-operational power state. For example, in a memory system with four power states S1, S2, S3, and S4, the latency to enter and exit S4 may be greater than S1 or S3. The memory controller may determine a power state transition through available power states that minimizes latency in transitioning from a current power state to another power state, such as when transitioning from a non-operational power state. In this way, when memory system exits the non-operational power state to perform an operation (e.g., an input/output (I/O) command), which operates at a certain power state, the memory system can transition first to the threshold power state (also referred to as an intermediate power state) rather than the current and higher-power state, and then transition to the corresponding power state to perform the I/O command.

In one aspect of the disclosure, a method includes determining, by a controller, a power state transition of a memory system to a non-operational power state; determining, by the controller after determining the power state transition, whether a current power state is a higher-power state than a threshold power state; and transmitting, by the controller after determining the current power state is the higher-power state than the threshold power state, a first command to the memory system to transition to the threshold power state before the memory system transitions to the non-operational power state.

In another aspect of the disclosure, an apparatus includes a controller of a host device configured to couple the host device to a memory system through a first interface, the controller configured to perform operations including: determining, by a controller, a power state transition of a memory system to a non-operational power state; determining, by the controller after determining the power state transition, whether a current power state is a higher-power state than a threshold power state; and transmitting, by the controller after determining the current power state is the higher-power state than the threshold power state, a first command to the memory system to transition to the threshold power state before the memory system transitions to the non-operational power state.

In an additional aspect of the disclosure, a user device includes a controller of a host device and a memory system. The controller is configured to perform operations including: determining a power state transition of a memory system to a non-operational power state; after determining the power state transition, determining whether a current power state is a higher-power state than a threshold power state; and after determining the current power state is the higher-power state than the threshold power state, transmitting a first command to the memory system to transition to the threshold power state before the memory system transitions to the non-operational power state. The memory system is configured to perform operations including: receiving the first command from the controller to transition to a threshold power state before the memory system transitions to the non-operational power state, the current power state being a higher-power state than the threshold power state.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
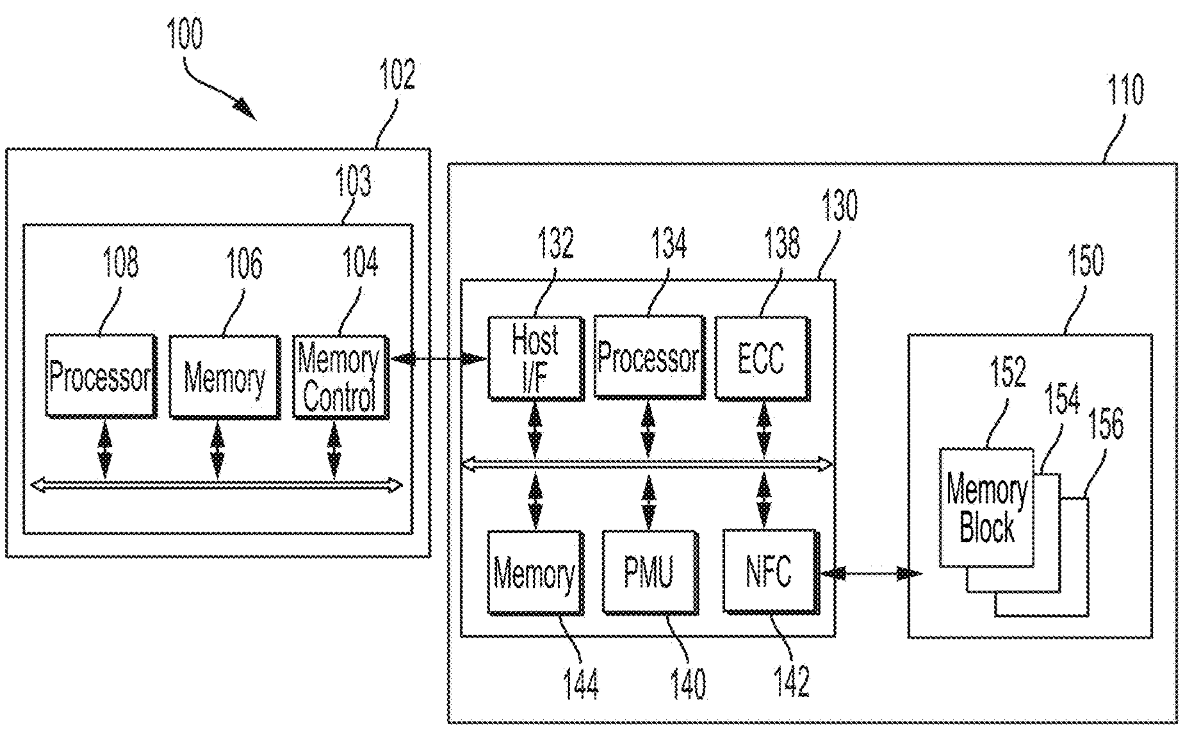
FIG. 1 is a block diagram illustrating a data processing system including a memory system in accordance with an embodiment of the present invention.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

As described above, a memory system may support multiple power states that enable high-speed data transfer rates, low latency, and long battery life. A power state allows a memory system to operate to consume an amount of power up to a corresponding maximum power to the power state. Each power state takes a time delay for a power state transition to enter and exit the respective power state (e.g., to transition from another power state to the respective power state and to transition from the respective power state to another power state). For example, Table 1 shows multiple example power states having different maximum powers, entry latencies, and exit latencies. In such examples, when the memory system receives an I/O command corresponding to power state 6 (maximum power 6 W), 20 us takes to enter power state 0. Similarly, when the memory system receives another I/O command corresponding to power state 0 (maximum power 25 W), 5,000 us takes to exit power the previous power state (i.e., power state 6), and 5 us takes to enter a new power state (i.e., power state 0).

TABLE 1

Example power states descriptor table

| Power State | Maximum Power | Entry Latency | Exit Latency |
|---|---|---|---|
| 0 | 25 W | 5 μs | 5 μs |
| 1 | 18 W | 5 μs | 7 μs |
| 2 | 18 W | 5 μs | 8 μs |
| 3 | 15 W | 20 μs | 15 μs |
| 4 | 10 W | 20 μs | 30 μs |
| 5 | 8 W | 50 μs | 50 μs |
| 6 | 5 W | 20 μs | 5,000 μs |

The memory system may transition back to the a recent operational power state from a non-operational power state to process a new input and output (I/O) command. For example, when the current or most recent power state is power state 6 as shown in Table 1 when the memory device enters the non-operational power state and when the memory device receives a command to transition to power state 0 during the non-operational power state, the total latency of the memory device is the sum of the entry and exit latencies of power state 6 and the entry latency of power state 0 (i.e., 20 μs (entry latency of power state 6)+5,000 μs (exit latency of power state 6)+5 μs (entry latency of power state 0)=5025 μs).

The present disclosure provides systems, apparatus, methods, and computer-readable media that support data processing, including techniques for storing, retrieving, and organizing data in a memory controller and a memory system. Aspects of this disclosure provide for operations and data structures used in operations for improved power state transition. A memory controller efficiently manages the power state transition of the memory system to reduce the total latency when the memory system exits a non-operational power state. For example, when the memory system enters the non-operational power state, the current or most recent power state may be a higher-power state, which takes a long time to exit, than a threshold power state. Then, the memory controller can replace the current or most recent power state to the threshold power state, which take a shorter time to exit than the current power state. In this way, when memory system exits the non-operational power state to perform an operation (e.g., an input/output (I/O) command), which operates at a certain power state, the memory system can transition first to the threshold power state rather than the current and higher-power state, and then transition to the power state to perform the I/O command.

Particular implementations of the subject matter described in this disclosure may be implemented to realize one or more of the following potential advantages or benefits. In some aspects, the present disclosure provides techniques for improved performance of a memory system, such as reducing the latency for a power state transition from the non-operational power state to an operational power state. For example, the memory controller can reduce the latency of the memory system by transitioning first to the threshold power state with a shorter latency rather than the most recent power state when the memory system transitions to the non-operational power state to another power state to perform the I/O command. This power state transition to the threshold power state before the non-operational power state enables the memory system to reduce the latencies caused due to low power states (e.g., PS4, PS5, PS6 in Table 1) for serving the upcoming high priority request. In this way, the disclosed system and method can reduce the latency by up to 99.2% for the example power states shown in Table 1.

Memory may be used in a computing system organized as illustrated in FIG. 1. FIG. 1 illustrates a data processing system or a user device 100, such as may be included in a mobile computing device, according to one or more aspects of the disclosure. A memory system 110 may couple to a host device 102 through one or more channels. For example, the host device 102 and memory system 110 may be coupled through a serial interface including a single channel for the transport of data or a parallel interface including two or more channels for the transport of data. In some aspects, control data may be transferred through the same channel(s) as the data or the control data may be transferred through additional channels.

The host device 102 may be, for example, a portable electronic device such as a mobile phone, an MP3 player, a laptop computer, or a non-portable electronic device such as a desktop computer, a game player, a television (TV), a media player, or a projector. As another example, the host device 102 may be an automotive computer system. The host device 102 may include a system on chip (SoC) 103 that includes a memory controller 104 to manage memory system power, a memory 106, and a processor 108.

The memory controller 104 may mange power states of the memory system 110 and transmit commands to the memory system 110, and may communicate with the memory system 110. The memory controller 104 may communicate with another system (e.g., a user input device, an external system, or an internal system of the data processing system or the user device 100) to receive an input or a command. The communication is made through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE). For example, the host interface 132 may be a parallel interface such as an MMC interface, or a serial interface such as an ultra-high speed class 1 (UHS-I)/UHS class 2 (UHS-II) or a universal flash storage (UFS) interface.

The memory 106 may serve as a working memory of the host device 102. The memory 106 may store host software to manage memory system power. Also, the memory may store instructions (e.g., steps in FIG. 4) for the processor 108 to perform. The memory 106 may be implemented with a volatile memory such as, for example, a static random access memory (SRAM) or a dynamic random access memory (DRAM). In some aspects, the memory 106 may store address mappings, a program memory, a data memory, a write buffer, a read buffer, a map buffer, and the like.

The processor 108 may control the general operations of the host device 102, manage power states, and transmit a write request or a read request to the memory system 110. For example, the processor 108 using the instructions or software in the memory 106 to determine the maximum power that may be allocated to the memory system 110 and set a power state to an operation that consumes the amount of power or less. In some examples, the processor may modify the power state to best satisfy changing power and performance objectives. The example power states and their maximum powers are listed in Table 1. The processor may execute firmware, which may be referred to as a flash translation layer (FTL), to control the general operations of the host device 102. The processor 108 may be implemented, for example, with a microprocessor or a central processing unit (CPU), or an application-specific integrated circuit (ASIC).

In some examples, the memory system 110 may be included in the host device 102. Thus, the data processing system or user device 100 may be any of the example host devices described herein including the memory system 110.

The memory system 110 may execute operations in response to commands (e.g., a request) from the host device 102. For example, the memory system 110 may store data provided by the host device 102 and the memory system 110 may also provide stored data to the host device 102. The memory system 110 may be used as a main memory, short-term memory, or long-term memory by the host device 102. As one example of main memory, the host device 102 may use the memory system 110 to supplement or replace a system memory by using the memory system 110 to store temporary data such as data relating to operating systems and/or threads executing in the operation system. As one example of short-term memory, the host device 102 may use the memory system 110 to store a page file for an operating system. As one example of long-term memory, the host device 102 may use the memory system 110 to store user files (e.g., documents, videos, pictures) and/or application files (e.g., word processing executable, gaming application).

The memory system 110 may be implemented with any one of various storage devices, according to the protocol of a host interface for the one or more channels coupling the memory system 110 to the host device 102. The memory system 110 may be implemented with any one of various storage devices, such as a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, or a memory stick.

The memory system 110 may include a memory module 150 and a system controller 130 coupled to the memory module 150 through one or more channels. The memory module 150 may store and retrieve data in memory blocks 152, 154, and 156 under control of the system controller 130, which may execute commands received from the host device 102. The system controller 130 is configured to control data exchange between the memory module 150 and the host device 102. The storage components, such as blocks 152, 154, and 156 in the memory module 150 may be implemented as volatile memory device, such as, a dynamic random access memory (DRAM) and a static random access memory (SRAM), or a non-volatile memory device, such as a read only memory (ROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (SCRAM), or a NAND flash memory.

The system controller 130 and the memory module 150 may be formed as integrated circuits on one or more semiconductor dies (or other substrate). In some aspects, the system controller 130 and the memory module 150 may be integrated into one chip. In some aspects, the memory module 150 may include one or more chips coupled in series or parallel with each other and coupled to the system controller 130, which is on a separate chip. In some aspects, the memory module 150 and system controller 130 chips are integrated in a single package, such as in a package on package (POP) system. In some aspects, the memory system 110 is integrated on a single chip with one or more or all of the components (e.g., application processor, system memory, digital signal processor, modem, graphics processor unit, memory interface, input/output interface, network adaptor) of the host device 102, such as in a system on chip (SoC). The system controller 130 and the memory module 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The system controller 130 of the memory system 110 may control the memory module 150 in response to commands from the host device 102. The system controller 130 may execute read commands to provide the data from the memory module 150 to the host device 102. The system controller 130 may execute write commands to store data provided from the host device 102 into the memory module 150. The system controller 130 may execute other commands to manage data in the memory module 150, such as program and erase commands. The system controller 130 may also execute other commands to manage control of the memory system 110, such as setting configuration registers of the memory system 110. By executing commands in accordance with the configuration specified in the configuration registers, the system controller 130 may control operations of the memory module 150, such as read, write, program, and erase operations.

The system controller 130 may include several components configured for performing the received commands. For example, the system controller 130 may include a host interface (I/F) unit 132, a processor 134, an error correction code (ECC) unit 138, a power management unit (PMU) 140, a NAND flash controller (NFC) 142, and/or a memory 144. The power management unit (PMU) 140 may provide and manage power for components within the system controller 130 and/or the memory module 150.

The host interface unit 132 may process commands and data provided from the host device 102, and may communicate with the host device 102. The host interface unit 132 can be similar to the memory controller 104.

The ECC unit 138 may detect and correct errors in the data read from the memory module 150 during the read operation. The ECC unit 138 may not correct error bits when the number of the error bits is greater than a threshold number of correctable error bits, which may result in the ECC unit 138 outputting an error correction fail signal indicating failure in correcting the error bits. In some aspects, no ECC unit 138 may be provided or the ECC unit 138 may be configurable to be active for some or all of the memory module 150. The ECC unit 138 may perform an error correction operation using a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM).

The NFC 142 provides an interface between the system controller 130 and the memory module 150 to allow the system controller 130 to control the memory module 150 in response to a commands received from the host device 102. The NFC 142 may generate control signals for the memory module 150, such as signals for rowlines and bitlines, and process data under the control of the processor 134. Although NFC 142 is described as a NAND flash controller, other controllers may perform similar function for other memory types used as memory module 150.

The memory 144 may serve as a working memory of the memory system 110 and the system controller 130. The memory 144 may store data for driving the memory system 110 and the system controller 130. When the system controller 130 controls an operation of the memory module 150 such as, for example, a read, write, program or erase operation, the memory 144 may store data which are used by the system controller 130 and the memory module 150 for the operation. The memory 144 may be implemented similar to the memory 106 of the host device 102.

The processor 134 may control the general operations of the memory system 110, and a write operation or a read operation for the memory module 150, in response to a write request or a read request received from the host device 102, respectively. For example, the processor 134 may execute firmware, which may be referred to as a flash translation layer (FTL), to control the general operations of the memory system 110. The processor 134 may be implemented similar to the processor 108 of the host device 102.

Figure 2:
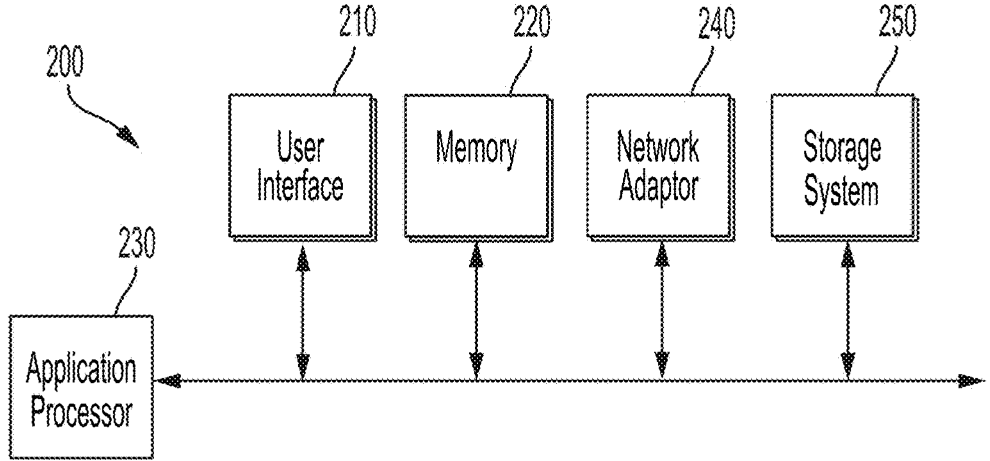
FIG. 2 is a block diagram illustrating an example electronic device including the memory system according to one or more aspects of the disclosure.

FIG. 2 is a block diagram illustrating an example electronic device including the data processing system or user device 100 according to one or more aspects of the disclosure. The electronic device 200 may include a user interface 210, a memory 220, an application processor 230, a network adaptor 240, and a storage system 250 (which may be one embodiment of the data processing system or user device 100 of FIG. 1). The application processor 230 may be coupled to the other components through a bus, such as a peripheral component interface (PCI) bus, including a PCI express (PCIe) bus.

The application processor 230 may execute computer program code, including applications, drivers, and operating systems, to coordinate performing of tasks by components included in the electronic device 200. For example, the application processor 230 may execute a storage driver for accessing the storage system 250. The application processor 230 may be part of a system-on-chip (SoC) that includes one or more other components shown in electronic device 200.

The memory 220 may operate as a main memory, a working memory, a buffer memory or a cache memory of the electronic device 200. The memory 220 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM, an LPDDR3 SDRAM, an LPDDR4 SDRAM, an LPDDR5 SDRAM, or an LPDDR6 SDRAM, or a nonvolatile random access memory such as a phase change random access memory (PRAM), a resistive random access memory (ReRAM), a magnetic random access memory (MRAM) and a ferroelectric random access memory (FRAM). In some aspects, the application processor 230 and the memory 220 may be combined using a package-on-package (POP).

The network adaptor 240 may communicate with external devices. For example, the network adaptor 240 may support wired communications and/or various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (Wi-Di), and so on, and may thereby communicate with wired and/or wireless electronic appliances, for example, a mobile electronic appliance.

The storage system 250 may store data, for example, data received from the application processor 230, and transmit data stored therein, to the application processor 230. The storage system 250 may be a non-volatile semiconductor memory device, such as a phase-change RAM (PRAM), a magnetic RAM (MRAM), a resistive RAM (ReRAM), a NAND flash memory, a NOR flash memory, or a 3-dimensional (3-D) NAND flash memory. The storage system 250 may be a removable storage medium, such as a memory card or an external drive. For example, the storage system 250 may correspond to the memory system 110 described above with reference to FIG. 1 and may be a SSD, eMMC, UFS, or other flash memory system.

The user interface 210 provide one or more graphical user interfaces (GUIs) for inputting data or commands to the application processor 230 or for outputting data to an external device. For example, the user interface 210 may include user input interfaces, such as a virtual keyboard, a touch screen, a camera, a microphone, a gyroscope sensor, or a vibration sensor, and user output interfaces, such as a liquid crystal display (LCD), an organic light emitting diode (OLED) display device, an active matrix OLED (AMOLED) display device, a light emitting diode (LED), a speaker, or a haptic motor. The operations and capabilities described above may be used for a memory system that supports improved power state transition and management.

Figure 3:
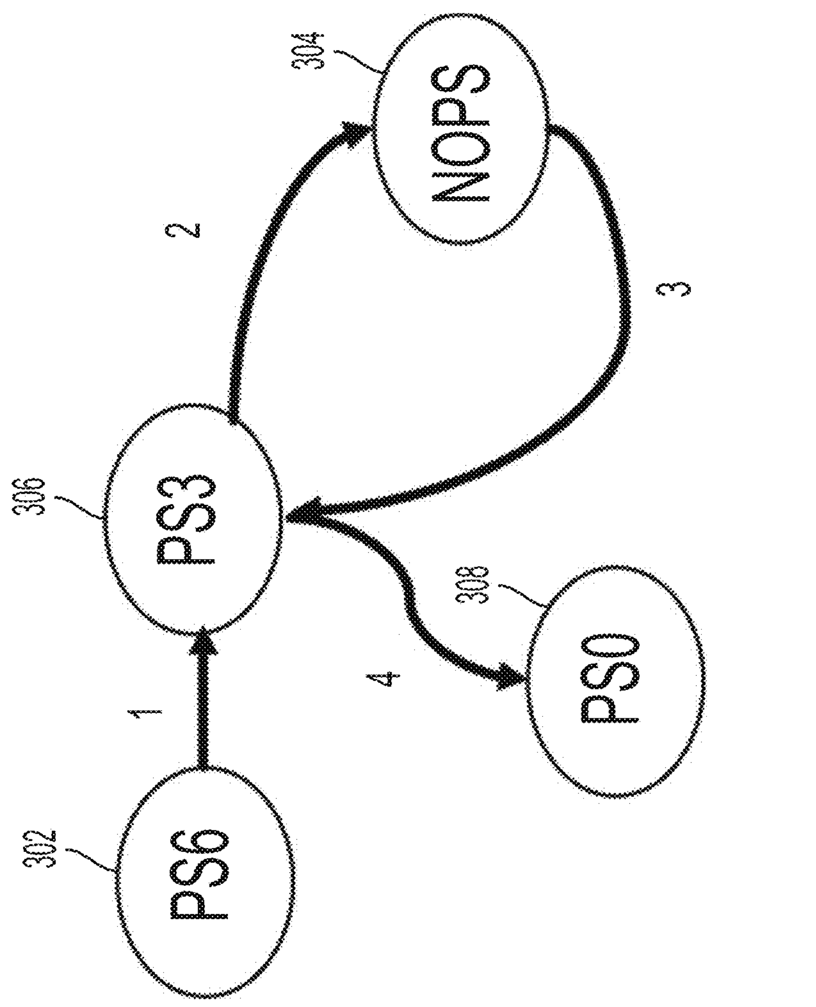
FIG. 3 is a schematic diagram to show an example of power state transition according to some embodiments of the disclosure.

FIG. 3 is a schematic diagram to show an example of power state transition according to some embodiments of the disclosure. For example, a controller (e.g., the memory controller 104 in FIG. 1) may transmit to a memory system (e.g., the memory system 110 in FIG. 1) a command (e.g., an I/O command that operates at power state 6 (302)) to transition to power state 6 (302). As shown in Table 1, power state 6 has a low maximum power and has a long latency (i.e., 5,000 μs) to exit the power state. Then, the controller may determine a power state transition of the memory system to a non-operational power state 304. Although in the conventional technology under the standard the memory system 110 enters the non-operational power state 304 from the power state 6, the controller disclosed herein determines that the current power state (e.g., power state 6 (302)) is a higher-power state than a threshold power state (e.g., power state 3 (306)) and transmits to the memory system an intermediate command to transition to the threshold power state (e.g., power state 3 (306)) before the memory system enters the non-operational power state 304. Then, the controller may transmit a command to transition to the non-operational power state 304. The additional latency to exit power state 6 (302) and enter power state 3 (306) does not affect the performance of the memory system because there is no command waiting to be executed if the memory system is entering the non-operational power state 304.

When the memory system is in the non-operational power state 304, the controller may receive an operation for execution by the memory system at a corresponding power state (e.g., power state 0 (308)). The controller may transmit a new command to transition to power state 0 (308). In some examples, the controller may transmit another command to transition from the non-operational power state to power state 3 (306) prior to the new command to transition to power state 0 (308). In other examples, when the memory system receives the new command to transition to power state 0 (308), the memory system may transition to the current or most recent power state (e.g., power state 3 (306)) first and then to power state 0 (308). In this way, the controller can reduce the latency of the memory system by using the intermediate or threshold power state (e.g., power state 3) when the memory system enters the corresponding power state (e.g., power state 0 (308)) to process the new command. In such examples, the latency to transition from the non-operational power state 304 to power state 0 (308) is 40 μs (entry latency to power state 3 (20 μs)+exit latency from power state 3 (15 μs)+entry latency to power state 0 (5 μs)). Contrary to the process disclosed herein, the conventional technology transitions to power state 6 (302) and then to power state 0, which takes 5025 μs (entry latency to power state 6 (20 μs)+exit latency from power state 6 (5,000 μs)+entry latency to power state 0 (5 μs)). Thus, in such examples, the process disclosed herein shows 99.2% latency improvement over the conventional technology.

Figure 4:
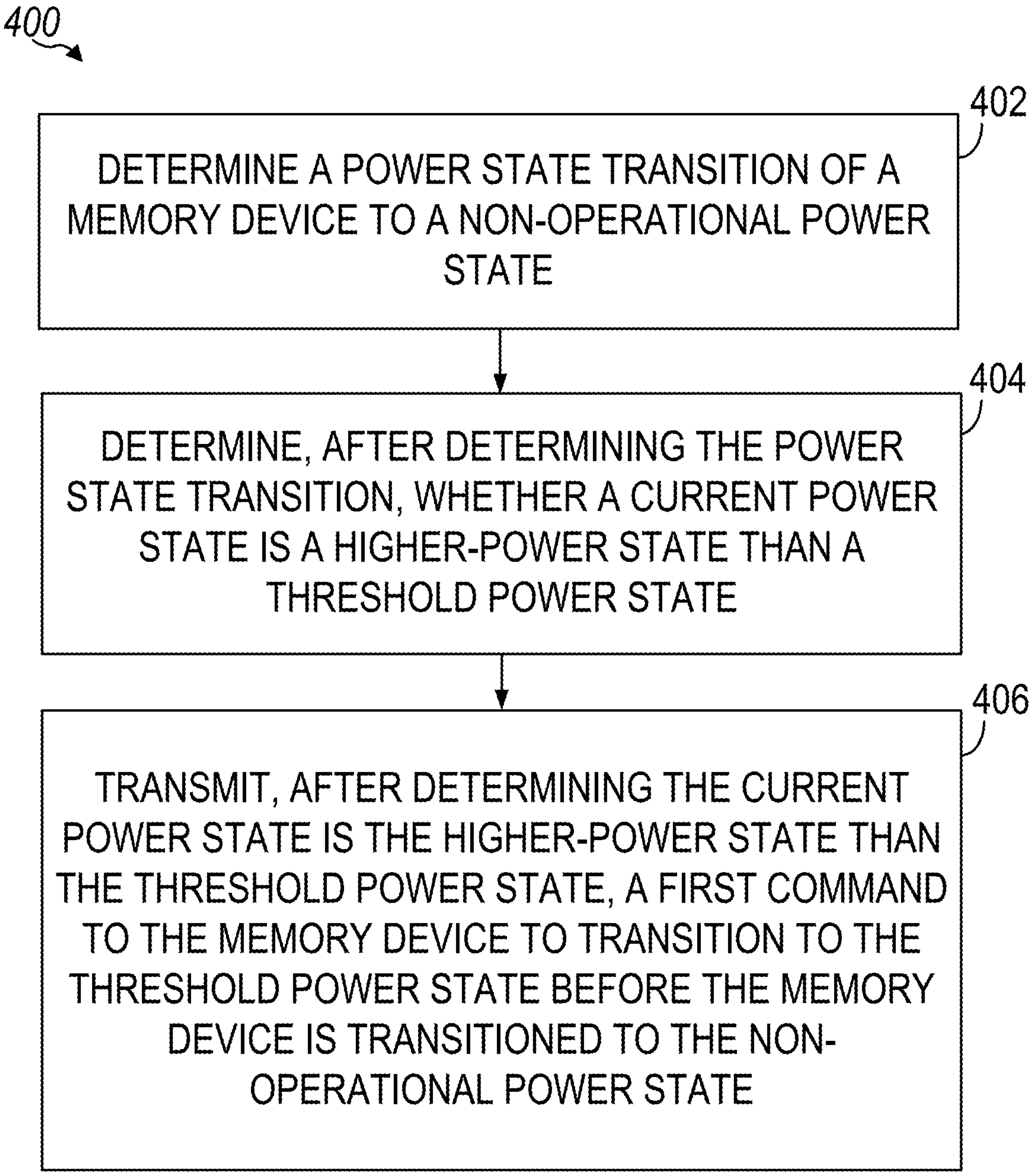
FIG. 4 is a flow chart illustrating a method for an improved power state transition according to some embodiments of the disclosure.

FIG. 4 is a flow chart illustrating a method 400 for an improved power state transition according to some embodiments of the disclosure. Each of the operations described with reference to FIG. 4 may be performed by a controller (e.g., the memory controller 104 in FIG. 1, the processor 108 coupled to the memory 106 of the memory controller 104, the system controller 130, the processor 134 coupled to the memory 144 of the system controller 130, and/or any other suitable processor or controller).

Figure 5:
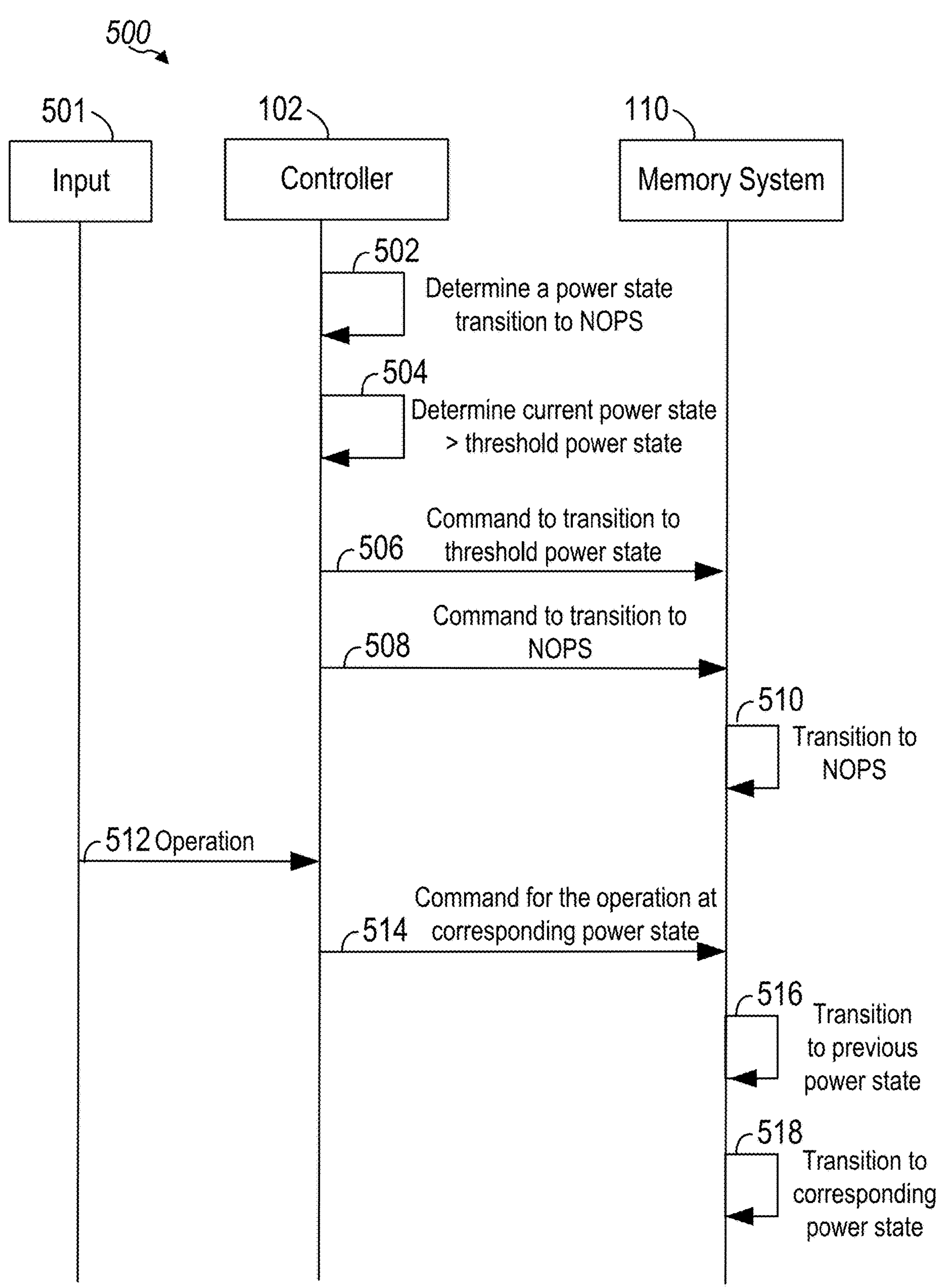
FIG. 5 is a call diagram illustrating interactions between a controller and a memory system for an improved power state transition according to some embodiments of the disclosure.

At block 402, the controller determines a power state transition of a memory system to a non-operational power state. FIG. 5 is a call diagram illustrating interactions between the controller and a memory system (e.g., the memory system 110 in FIG. 1) for an improved power state transition according to some embodiments of the disclosure. In FIG. 5, step 502 corresponds to block 402. For example, the controller determines a power state transition to a non-operational power state at step 502 in FIG. 5. In the non-operational power state, the memory system consumes near zero or zero power and. In the non-operational power state, the memory system does not process a I/O command but may perform limited operations like memory-mapped I/O (MMIO) accesses, configuration register accesses and serve admin queue commands.

The controller may determine the power state transition of the memory system based on one or more various conditions. For example, the controller may determine the power state transition based on a timer indicating that a command for the memory system to operate has not been transmitted to the memory system for a predetermined period of time. When the controller receives an operation for execution by the memory system or the memory system completes the operation, the controller may start the timer. Then, the controller may determine the power state transition to the non-operational power state when the timer reaches a predetermined amount of time. In other examples, the controller may determine the power state transition based on an input (e.g., a user input to transition to the non-operational power state or an input from another system). In further examples, the controller may determine the power state transition based on an energy state. For example, when a battery to produce power to the controller and the memory system is in a low energy state or produces a voltage below a threshold voltage level, the controller may determine the power state transition if there is no I/O command to process.

Referring again to FIG. 4, at block 404, the controller determines whether a current power state is a higher-power state than a threshold power state after determining the power state transition. In FIG. 5, step 504 corresponds to block 404. For example, the controller determines whether a current power state is a higher-power state than a threshold power state after determining the power state transition at step 504 in FIG. 5.

The current power state may be the most recent power state that the controller transmitted to the memory system. In such examples, the memory system may operate based on the most recent power state until the memory system receives a new command to transition to a new power state. For example, when the controller transmits to the memory system a command to transition to a power state, the controller may store the power state as a register value in a register of the controller and write the power state in a register of the memory system. In some examples, the controller may use a Set Feature command to set the power state in a register of the memory system. In some examples, the power state in the register in the controller and the memory system may correspond to a maximum power of the power state. For example, power state 0 as '0' in a register as shown in Table 1 may correspond to the maximum power of 25 W while power state 6 as '6' in the register may correspond to the maximum power of 5 W. Thus, the power management unit 140 in the memory system may provide up to the maximum power indicated in the power state of the register for components within the system controller 130 and/or the memory module 150. The controller and the memory system may hold the power state in the register until the controller transmits a new command to transition to another power state to the memory system. For example, when the controller transmits another command to transition to a new power state to the memory system, the controller and the memory system may overwrite the register that store the most recent power state to the new power state.

In some examples, the threshold power state may indicate a mean power state of multiple power states. For example, as shown in Table 1, the number of power states that the memory system can support may be 7 from power state 0 to power state 6. In such examples, the threshold power state may be power state 3 that is a mean power state of the 7 power states. It should be appreciated that the memory system may support any other suitable number of power states (e.g., 10, 16, and 32 power states). In other examples, the threshold power state may be a first power state having a latency (e.g., an entry latency, an exit latency, or a sum of the entry and exit latencies) longer than a latency threshold. For example, when a latency threshold is 30 μs for a sum of entry and exit latencies, the threshold power state may be power state 3 because power state 3 is the first power state having the sum of the entry and exit latencies longer than the latency threshold. The threshold power state may be determined to optimize the latency during power state transitions. In some examples, the threshold power state may be determined based on the exit latency of the threshold power state and the entry latency of the next power state. In some examples, to determine the threshold power state, the exit latency of the threshold power state and the entry latency of an active power state after the non-operational power state may be considered. The exit latency of the current power state and the entry latency of the threshold power state may be less considered because when the memory state transitions to the non-operational power state, there is no high priority task to perform.

In such examples described above, a higher power state than the threshold power state has a lower maximum power and a longer latency (e.g., the entry latency and the exit latency) than the threshold power state. A lower power state than the threshold power state has a higher maximum power and a shorter latency than the threshold power state. In other examples, a higher power state than the threshold power state has a higher maximum power and a shorter latency than the threshold power state. A lower power state than the threshold power state has a lower maximum power and a longer latency than the threshold power state. In such examples, the controller may determine whether a current power state is a lower-power state than the threshold power state after determining to make a power state transition.

Referring again to FIG. 4, at block 406, the controller transmits a first command to the memory system to transition to the threshold power state before the memory system transitions to the non-operational power state. In FIG. 5, step 506 corresponds to block 406. For example, the controller transmits first command to the memory system to transition to the threshold power state at step 506 in FIG. 5. The memory system receives the first command from the controller. In some embodiments, the command of step 506 may be a power state change command. In some embodiments, the command of step 506 may be a register write to set a previous power state register of the memory system, in which the command to transition to NOPS at step 508 implicitly indicates transitioning first to the previous power state stored in the register set at step 506 before transitioning to NOPS.

The power state transition may indicate that the memory system transitions from one power state having a maximum power to another power state having a different maximum power. In some examples, a command to transition to another power state may be included in an I/O command that uses a certain power to read or write in the memory module 150. In such example, the I/O command may be associated with a power state. Thus, when the controller transmits an I/O command to the memory system 110, the I/O command may include a command to transition to the power state corresponding to the I/O command. In other examples, a command may indicate a power state transition without involving an I/O command. For example, the first command to transition to the threshold power state does not necessarily involve an I/O command. In such examples, the command does not instruct the memory system to read or write the memory module 150 but may instruct the power management unit 140 of the memory system 110 to transition the current power state to another power state. In further examples, the command may include an admin command or fabrics command for the power state transition.

In some examples, the first command to transition to the threshold power state may enable the memory system to write an indication in a register of the memory system to indicate the threshold power state as a previous power state. For example, based on the first command, the memory system may write a reserved register (e.g., 130:101 or 119:117 of a Power State Descriptor Data Structure may be reserved for indicating that a mean power state capability is enabled or disabled) to use the threshold power state as the previous or most recent power state or not. If the register has a value of ‘0,’ the memory system may use the threshold power state as the previous or most recent power state. If the register has a value of ‘1,’ the memory system may use the current power state at block 404 as a previous power state without using the threshold power state. In other examples, the memory system may write the threshold power state in the register for the previous power state over the current power state. When the controller determines the current power state is equal to or less than the threshold power state, the controller may not transmit the first command to transition to the threshold power state. In such examples without transmitting the first command, step 506 of FIG. 5 may be omitted. In the examples, the register of the memory system for the previous power state may maintain the current power state.

Then, the memory system may transition to the non-operational power state. In some examples, the controller may transmit a command to the memory system to transition to the non-operational power state as shown in step 508 in FIG. 5. For example, after the controller transmits the first command to transition to the threshold power state, the controller may transmit to the memory system a second command to transition to the non-operational power state. Similar to the first command, the second command may not involve an I/O command to enable the memory system to process but may control the power management unit 140 to reduce the power to zero or near zero. In some examples, the non-operational power state field of the data structure in the memory system may use a different data field than the field for the previous power state stored in the register. For example, the second command may use the Set Feature command to enable the non-operational power state in the field. Thus, regardless that the non-operational power state field for the non-operational power state is enabled or disabled, the memory system may maintain the previous power state (e.g., the threshold power state or the current power state) in the register.

In response to the second command from the controller, the memory system may enter the non-operational power state as shown in step 510 in FIG. 5. In further examples, after determining the current power state is equal to or lower than the threshold power state, the controller may not transmit the first command to the memory system, and the memory system may be directly transitioned from the current power state to the non-operational power state in step 508 of FIG. 5. In such examples, the controller may transmit the second command to the memory system to transition to the non-operational power state, or the memory system may be directly transitioned from the current power state to the non-operational power state.

In other examples, the memory system may transition to the non-operational power state without an explicit command from the controller. For example, the memory system may have a timer to enter the non-operational power state when the memory system has not received a command (e.g., an I/O command) for the predetermined period of time in the timer. In some examples, the timer of the memory system may operate only for a substantive command (e.g., an I/O command). For example, the memory system may not reset the timer for the first command to transition to the threshold power state without involving an I/O command. In such examples, step 508 of FIG. 5 may be omitted. Then, the memory system may enter the non-operational power state as shown in step 510 in FIG. 5.

During the non-operational power state of the memory system, the controller may receive an operation for execution by the memory system at a corresponding power state as shown in step 512 in FIG. 5. In some examples, the operation may be received from an input 501. The input may include a user input (e.g., from a keyboard, a mouse, or any other suitable input device), an input from an external system (e.g., a signal from a external system to the use device that includes the memory controller 104 and the memory system 110), an input from an internal component of the user device that includes the memory controller 104 and the memory system 110 (e.g., a system interruption from a component in the user device), or any other suitable input. The operation may include an I/O command that uses up to the corresponding power state to write or read the memory module in the memory system.

The controller may transmit a command to the memory system for the operation at the corresponding power state to the memory system to transition to the corresponding power state from the threshold power state as shown in step 514 in FIG. 5. In some examples, the controller may transmit a command to the memory system for the operation at the corresponding power state to the memory system to transition to the corresponding power state. The command may cause the memory system to transition to the threshold power state before transitioning to the corresponding power state. In such examples, the controller may explicitly send the command to transition to the threshold power state or does not send an explicit command but enable the memory system to transition to the threshold power state. Then, the memory system may receive the command to perform the operation at the corresponding power state. To perform the operation at the corresponding power state, the memory system may first transition from the non-operational power state to the previous power state and then transition from the previous power state to the corresponding power state to perform the operation as shown in step 516 in FIG. 5. In some examples, the previous power state may be the threshold power state when the register to indicate the threshold as the previous power state is enabled. When the register to indicate the threshold as the previous power state is disabled, the previous power state may be the current power state as described at block 404. In other examples, the previous power state may be stored in the register in the memory system for the previous power state. The previous power state may be the threshold power state or the current power state depending on the current power state as described at block 404. After the memory system transitions from the non-operational power state to the previous power state, the memory system may transition from the previous power state to the corresponding power state to perform the operation as shown in step 518 in FIG. 5. In other examples, the previous power state may be stored in the memory of the controller, and the controller may transmit a command including the previous power state to the memory system to transition from the non-operational power state to the previous state. Then, the controller may also transmit another command including the corresponding power state to the memory system to transition from the previous power state to the corresponding power state.

Figure 6:
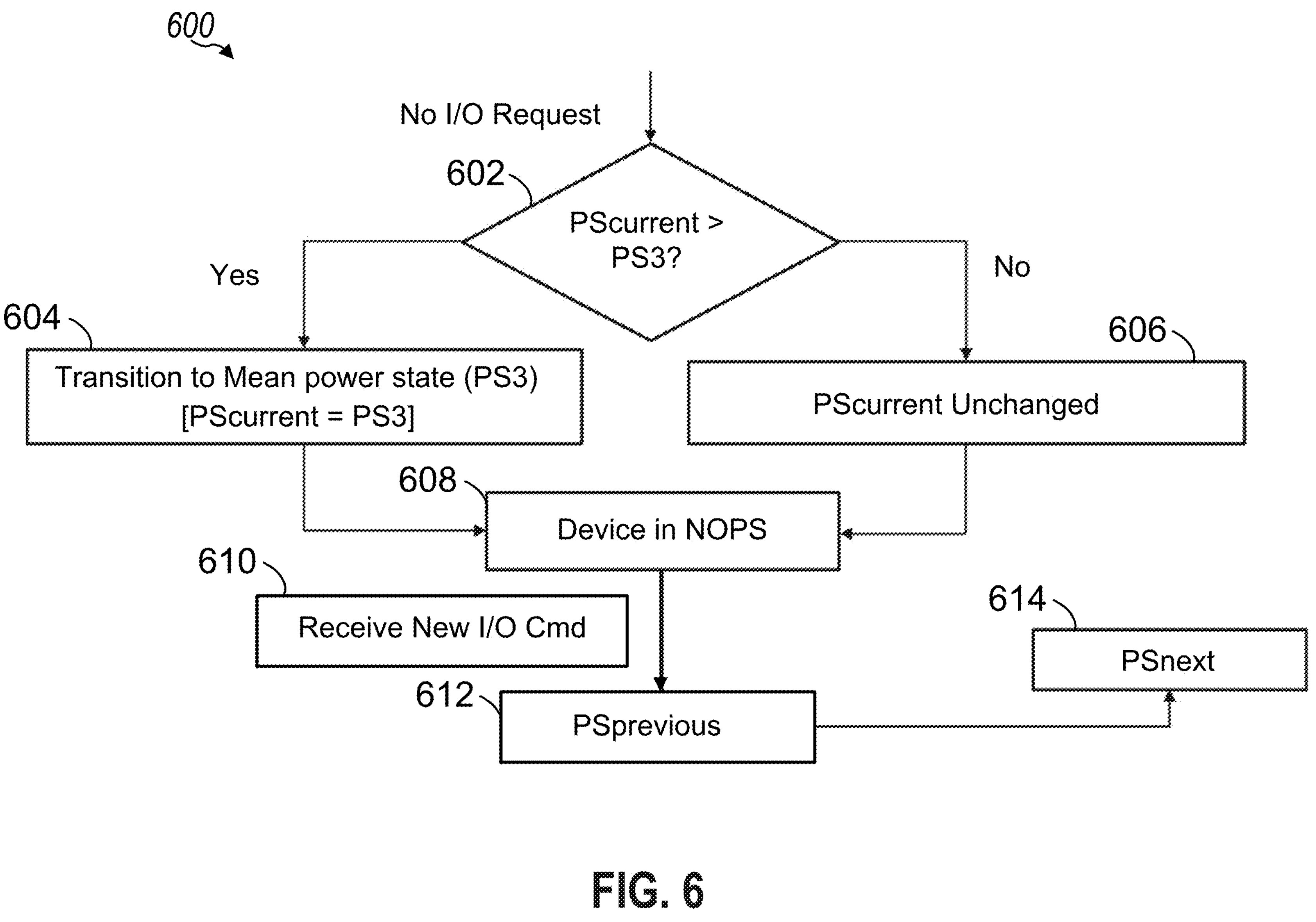
FIG. 6 is a flow diagram illustrating an algorithm of a controller for a improved power state transition according to some embodiments of the disclosure.

FIG. 6 is a flow diagram 600 illustrating an algorithm of the controller for a improved power state transition according to some embodiments of the disclosure. In the algorithm, when the controller does not have a command (e.g., an I/O command) to enable the memory system to process, the controller may determine a condition at step 602. The condition may be whether the current power state is a higher-power state than the threshold power state (e.g., power state 3 in FIG. 6) after determining the power state transition. Step 602 in FIG. 6 may correspond to blocks 402 and 404 in FIG. 4 and steps 502 and 504 in FIG. 5.

Whether to transmit the first command is shown in steps 604 and 606 in FIG. 6. For example, after determining the current power state is the higher-power state than the threshold power state in step 602, the controller may transmit the first command to the memory system to transition to the threshold power state in step 604. Step 604 in FIG. 6 may correspond to block 406 in FIG. 4 and step 506 in FIG. 5. However, after determining the current power state is equal to or lower than the threshold power state in step 602, the controller may not transmit the first command to the memory system, and the memory system and the controller may maintain the current power state in step 606.

Then, the memory system may transition to the non-operational power state as shown in step 608 in FIG. 6. Step 608 in FIG. 6 may correspond to step 510 in FIG. 5. During the non-operational power state, the controller may receive and transmit a new I/O command to the memory system for an operation at a corresponding power state as shown in step 610 in FIG. 6. Step 610 in FIG. 6 may correspond to steps 512 and 514 in FIG. 5.

To perform the operation at the corresponding power state, the memory system may first transition from the non-operational power state to the previous power state and then transition from the previous power state to the corresponding power state to perform the operation as shown in step 612 in FIG. 6. The previous state may be the current state at step 606 or the threshold power state at step 604. Step 612 in FIG. 6 may correspond to steps 516 in FIG. 5.

After the memory system transitions from the non-operational power state to the previous power state, the memory system may transition from the previous power state to the corresponding power state (or next power state PSNext) to perform the operation as shown in step 614 in FIG. 6. Step 614 in FIG. 6 may correspond to step 518 in FIG. 5. Thus, when the current power state is a higher-power state than the threshold power state, the controller may replace the current power state as a previous power state to the threshold power state and reduces the latency when the memory system transitions from the non-operational power state to an active power state to serve an upcoming high priority request.

Table 2 shows the latency improvement of the memory system when the memory system was in a higher-power state (e.g., power state 4-6 in Table 1) than the threshold power state (e.g., power state 3 in Table 1) and transitions from the non-operational power state to another power state.

TABLE 2

Latency comparison between prior art and disclosed system and method

| Current or previous Power State | Threshold Power State | Next Power State | Prior Art (μs) | Disclosed System/ Method (μs) |
|---|---|---|---|---|
| PS6 | PS3 | PS6 | 20 | 55 |
| | | PS5 | 5070 | 85 |
| | | PS4 | 5040 | 55 |
| | | PS3 | 5040 | 55 |
| | | PS2 | 5025 | 43 |
| | | PS1 | 5025 | 40 |
| | | PS0 | 5025 | 40 |
| PS5 | PS3 | PS6 | 120 | 55 |
| | | PS5 | 50 | 85 |
| | | PS4 | 120 | 55 |
| | | PS3 | 120 | 20 |
| | | PS2 | 105 | 40 |
| | | PS1 | 105 | 40 |
| | | PS0 | 105 | 40 |
| PS4 | PS3 | PS6 | 70 | 55 |
| | | PS5 | 100 | 85 |
| | | PS4 | 20 | 55 |
| | | PS3 | 70 | 20 |
| | | PS2 | 85 | 40 |
| | | PS1 | 85 | 40 |
| | | PS0 | 55 | 40 |

Figure 7:
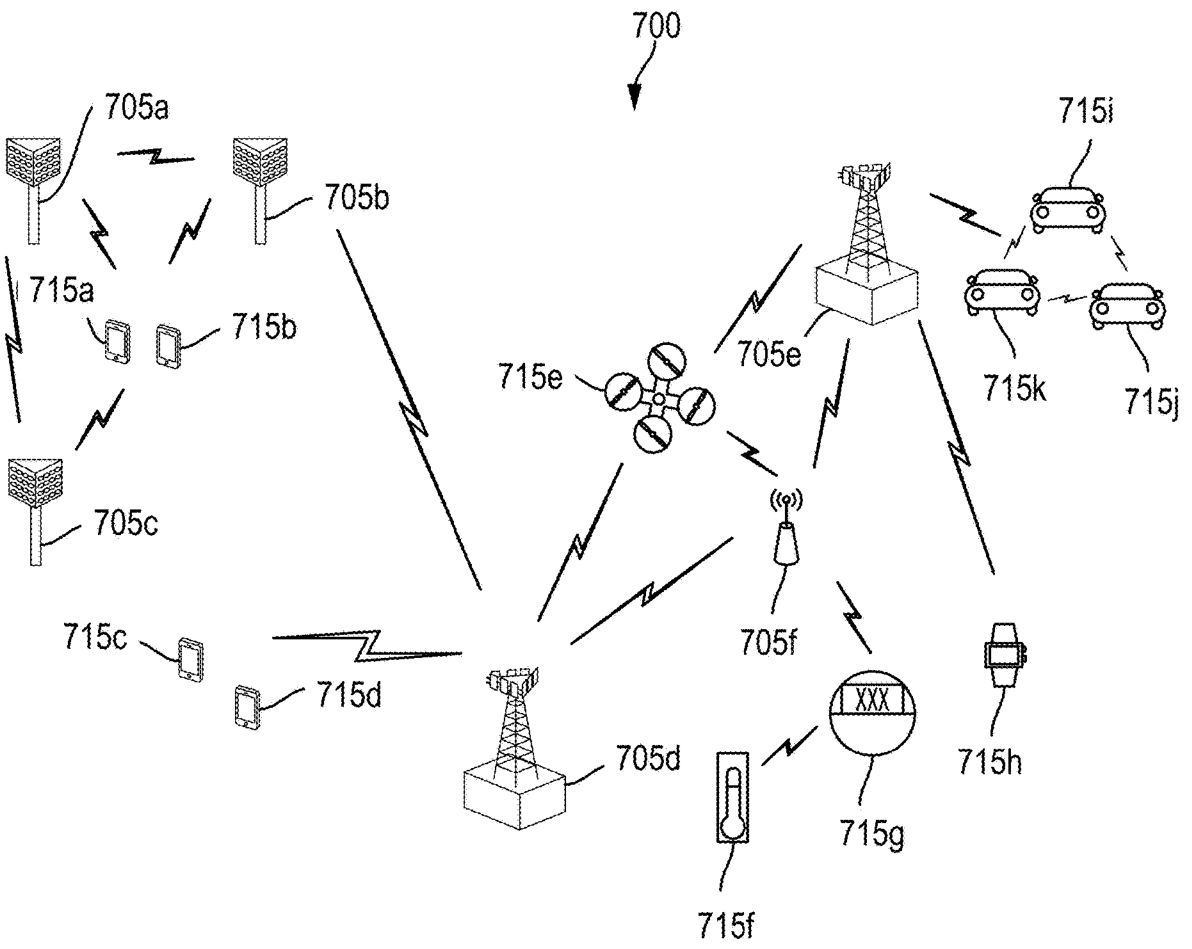
FIG. 7 is a block diagram illustrating details of an example wireless communication system according to one or more aspects.

Operations of method 300, method 400, or method 500 may be performed by a UE, such as a UE described with reference to FIG. 7. For example, example operations (also referred to as "blocks") of method 300, method 400, or method 600 may enable UE 715 to support greater user data confidentiality. FIG. 7 is a block diagram illustrating details of an example wireless communication system according to one or more aspects. The wireless communication system may include wireless network 700. Wireless network 700 may, for example, include a 5G wireless network. As appreciated by those skilled in the art, components appearing in FIG. 7 are likely to have related counterparts in other network arrangements including, for example, cellular-style network arrangements and non-cellular-style-network arrangements (e.g., device to device or peer to peer or ad hoc network arrangements, etc.).

Wireless network 700 illustrated in FIG. 7 includes a number of base stations 705 and other network entities. A base station may be a station that communicates with the UEs and may also be referred to as an evolved node B (eNB), a next generation eNB (gNB), an access point, and the like. Each base station 705 may provide communication coverage for a particular geographic area. In 3GPP, the term "cell" may refer to this particular geographic coverage area of a base station or a base station subsystem serving the coverage area, depending on the context in which the term is used. In implementations of wireless network 700 herein, base stations 705 may be associated with a same operator or different operators (e.g., wireless network 700 may include a plurality of operator wireless networks). Additionally, in implementations of wireless network 700 herein, base station 705 may provide wireless communications using one or more of the same frequencies (e.g., one or more frequency bands in licensed spectrum, unlicensed spectrum, or a combination thereof) as a neighboring cell. In some examples, an individual base station 705 or UE 715 may be operated by more than one network operating entity. In some other examples, each base station 705 and UE 715 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 7, base stations 705*d* and 705*e* are regular macro base stations, while base stations 705*a*-705*c* are macro base stations enabled with one of 3 dimension (3D), full dimension (FD), or massive MIMO. Base stations 705*a*-705*c* take advantage of their higher dimension MIMO capabilities to exploit 3D beamforming in both elevation and azimuth beamforming to increase coverage and capacity. Base station 705*f* is a small cell base station which may be a home node or portable access point. A base station may support one or multiple (e.g., two, three, four, and the like) cells.

Wireless network 700 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 715 are dispersed throughout the wireless network 700, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 715, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a flying device, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 715*a*-715*d* of the implementation illustrated in FIG. 7 are examples of mobile smart phone-type devices accessing wireless network 700. A UE may also be a machine specifically configured for connected communication, including machine type communication (MTC), enhanced MTC (eMTC), narrowband IoT (NB-IoT) and the like. UEs 715*e*-715*k* illustrated in Figure are examples of various machines configured for communication that access wireless network 700.

A mobile apparatus, such as UEs 715, may be able to communicate with any type of the base stations, whether macro base stations, pico base stations, femto base stations, relays, and the like. In FIG. 7, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 700 may occur using wired or wireless communication links.

In operation at wireless network 700, base stations 705*a*-705*c* serve UEs 715*a* and 715*b* μsing 3D beamforming and coordinated spatial techniques, such as coordinated multipoint (CoMP) or multi-connectivity. Macro base station 705*d* performs backhaul communications with base stations 705*a*-705*c*, as well as small cell, base station 705*f*. Macro base station 705*d* also transmits multicast services which are subscribed to and received by UEs 715*c* and 715*d*. Such multicast services may include mobile television or stream video, or may include other services for providing community information, such as weather emergencies or alerts, such as Amber alerts or gray alerts.

Wireless network 700 of implementations supports mission critical communications with ultra-reliable and redundant links for mission critical devices, such UE 715*e*, which is a aeronautical vehicle. Redundant communication links with UE 715*e* include from macro base stations 705*d* and 705*e*, as well as small cell base station 705*f*. Other machine type devices, such as UE 715*f* (thermometer), UE 715*g* (smart meter), and UE 715*h* (wearable device) may communicate through wireless network 700 either directly with base stations, such as small cell base station 705*f*, and macro base station 705*e*, or in multi-hop configurations by communicating with another user device which relays its information to the network, such as UE 715*f* communicating temperature measurement information to the smart meter, UE 715*g*, which is then reported to the network through small cell base station 705*f*. Wireless network 700 may also provide additional network efficiency through dynamic, low-latency TDD communications or low-latency FDD communications, such as in a vehicle-to-vehicle (V2V) mesh network between UEs 715*i*-715*k* communicating with macro base station 705*c*.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards. A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. The various different network types may use different radio access technologies (RATs) and RANs.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In one or more aspects, techniques for supporting data storage and/or data transmission, may include additional aspects, such as any single aspect or any combination of aspects described below or in connection with one or more other processes or devices described elsewhere herein. In a first aspect, an electronic device, such as a UE, may be an apparatus as a host device that includes a memory controller configured to couple to an interface to a memory system, in which the memory system may be integrated with the host device or externally coupled to the host device. The memory system may include a memory controller coupled to a memory system through a first channel and configured to access data stored in the memory system through the first channel and coupled to a host device through a first interface and configured to communicate with the host device over the first interface. The operations may be executed as part of an initialization operation, a read operation or a write operation.

In a first aspect, a method comprises: determining, by a controller, a power state transition of a memory system to a non-operational power state; determining, by the controller after determining the power state transition, whether a current power state is a higher-power state than a threshold power state; and transmitting, by the controller after determining the current power state is the higher-power state than the threshold power state, a first command to the memory system to transition to the threshold power state before the memory system transitions to the non-operational power state.

In a second aspect, in combination with the first aspect, the method further comprises: transmitting, by the controller after transmitting the first command, a second command to the memory system to transition to the non-operational power state.

In a third aspect, in combination with one or more of the first aspect or the second aspect, the method further comprises: receiving, by the controller, an operation during the non-operational power state for execution by the memory system at a corresponding power state; and transmitting, by the controller, a second command to the memory system to transition to the corresponding power state, wherein the second command causes the memory system to transition to the threshold power state before transitioning to the corresponding power state.

In a fourth aspect, in combination with one or more of the first aspect through the third aspect, the threshold power state a mean power state of a plurality of power states.

In a fifth aspect, in combination with one or more of the first aspect through the fourth aspect, the method further comprises: transmitting, by the controller after determining the current power state is equal to or lower than the threshold power state, a second command to the memory system to transition the memory system to the non-operational power state.

In a sixth aspect, in combination with one or more of the first aspect through the fifth aspect, transmitting the first command comprises: writing, by the controller, an indication in a register of the memory system to indicate the threshold power state as a previous power state.

In a seventh aspect, in combination with one or more of the first aspect through the sixth aspect, an apparatus comprises a controller of a host device configured to couple the host device to a memory system through a first interface, the controller configured to perform operations including: determining a power state transition of the memory system to a non-operational power state; determining, after determining the power state transition, whether a current power state is a higher-power state than a threshold power state; and transmitting, after determining the current power state is the higher-power state than the threshold power state, a first command to the memory system to transition to the threshold power state before the memory system transitions to the non-operational power state.

In an eighth aspect, in combination with one or more of the first aspect through the seventh aspect, a user device comprises a controller of a host device and a memory system. The controller is configured to perform operations comprising: determining a power state transition of the memory system to a non-operational power state; after determining the power state transition, determining whether a current power state is a higher-power state than a threshold power state; and transmitting, after determining the current power state is the higher-power state than the threshold power state, a first command to the memory system to transition to the threshold power state before the memory system transitions to the non-operational power state. The memory system is configured to perform steps comprising: receiving the first command from the controller to transition to a threshold power state before the memory system transitions to the non-operational power state, the current power state being a higher-power state than the threshold power state.

In a ninth aspect, in combination with one or more of the first aspect through the eighth aspect, the controller is configured to perform the operations further comprising: transmitting, after transmitting the first command, a second command to the memory system to transition to the non-operational power state.

In a tenth aspect, in combination with one or more of the first aspect through the ninth aspect, the controller is configured to perform the operations further comprising: writing a register of the memory system to indicate the threshold power state as a previous power state.

In an eleventh aspect, in combination with one or more of the first aspect through the tenth aspect, the controller is configured to perform the operations further comprising: receiving, by the controller, an operation during the non-operational power state for execution by the memory system at a corresponding power state; and transmitting, by the controller, a second command for the operation at the corresponding power state to the memory system to transition to the corresponding power state, wherein the second command causes the memory system to transition to the threshold power state before transitioning to the corresponding power state.

In a twelfth aspect, in combination with one or more of the first aspect through the eleventh aspect, the memory system is configured to perform the operations further comprising: transitioning from the non-operational power state to the threshold power state based on the register; and after transitioning to the threshold power state, transitioning from the threshold power state to the corresponding power state.

In a thirteenth aspect, in combination with one or more of the first aspect through the twelfth aspect, the controller is configured to perform the operations further comprising: transmitting, after determining the current power state as a previous power state is equal to or lower than the threshold power state, a second command to the memory system to transition to the non-operational power state. The memory system is configured to perform the operations further comprising: receiving the second command from the controller; and transitioning to the non-operational power state based on the second command.

In a fourteenth aspect, in combination with one or more of the first aspect through the thirteenth aspect, the controller is configured to perform the operations further comprising: receiving an operation during the non-operational power state for execution by the memory system at a corresponding power state; and transmitting, by the controller, a third command to the memory system to transition to the corresponding power state. The memory system is configured to perform the operations further comprising: receiving the third command from the controller; transitioning from the non-operational power state to the previous power state; and after transitioning to the previous power state, transitioning from the previous power state to the corresponding power state based on the third command.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 1-6 may be combined with one or more blocks (or operations) described with reference to another of the figures. For example, one or more blocks (or operations) of FIGS. 1-2 may be combined with one or more blocks (or operations) of FIGS. 3-6.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as “upper” and “lower” or “front” and back” or “top” and “bottom” or “forward” and “backward” are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:

determining, by a controller, to transition a power state of a memory system to a non-operational power state;

determining, by the controller, after determining to transition the power state of the memory system to the non-operational power state, whether a current power state is a higher-power state than a threshold power state; and transmitting, by the controller, after determining the current power state is the higher-power state than the threshold power state, a first command to the memory system to transition to the threshold power state before the memory system transitions to the non-operational power state.

2. The method of claim 1, further comprising:

transmitting, by the controller and after transmitting the first command, a second command to the memory system to transition to the non-operational power state.

3. The method of claim 1, further comprising:

receiving, by the controller, an operation during the non-operational power state for execution by the memory system at a corresponding power state; and transmitting, by the controller, a second command to the memory system to transition to the corresponding power state, wherein the second command causes the memory system to transition to the threshold power state before transitioning to the corresponding power state.

4. The method of claim 1, wherein the threshold power state is a mean power state of a plurality of power states.

5. The method of claim 1, wherein transmitting the first command comprises:

writing, by the controller, an indication in a register of the memory system to indicate the threshold power state as a previous power state.

6. An apparatus, comprising:

a controller, of a host device, configured to couple the host device to a memory system through a first interface and perform operations including:

determining to transition a power state of the memory system to a non-operational power state;

determining, after determining to transition the power state of the memory system to the non-operational power state, whether a current power state is a higher-power state than a threshold power state; and transmitting, after determining the current power state is the higher-power state than the threshold power state, a first command to the memory system to transition to the threshold power state before the memory system transitions to the non-operational power state.

7. The apparatus of claim 6, wherein the operations further include:

transmitting, after transmitting the first command, a second command to the memory system to transition to the non-operational power state.

8. The apparatus of claim 6, wherein the operations further include:

receiving an operation during the non-operational power state for execution by the memory system at a corresponding power state; and transmitting a second command to the memory system to transition to the corresponding power state, wherein the second command causes the memory system to transition to the threshold power state before transitioning to the corresponding power state.

9. The apparatus of claim 6, wherein the threshold power state is a mean power state of a plurality of power states.

10. The apparatus of claim 6, wherein transmitting the first command comprises:

writing, by the controller, in a register of the memory system to indicate the threshold power state as a previous power state.

11. A user device comprising:

a controller, of a host device, configured to perform controller operations comprising:

determining to transition a power state of a memory system to a non-operational power state;

determining, after determining to transition the power state of the memory system to the non-operational power state, whether a current power state is a higher-power state than a threshold power state; and transmitting, after determining the current power state is the higher-power state than the threshold power state, a first command to the memory system to transition to the threshold power state before the memory system transitions to the non-operational power state; and a memory system configured to perform memory system operations comprising:

receiving the first command from the controller to transition to the threshold power state before the memory system transitions to the non-operational power state, the current power state being the higher-power state than the threshold power state.

12. The user device of claim 11, wherein the controller operations further comprise:

transmitting, after transmitting the first command, a second command to the memory system to transition to the non-operational power state.

13. The user device of claim 11, wherein the controller operations further comprise:

writing in a register of the memory system to indicate the threshold power state as a previous power state.

14. The user device of claim 13, wherein the controller operations further comprise:

receiving an operation during the non-operational power state for execution by the memory system at a corresponding power state; and transmitting a second command for the operation at the corresponding power state to the memory system to transition to the corresponding power state, wherein the second command causes the memory system to transition to the threshold power state before transitioning to the corresponding power state.

15. The user device of claim 14, wherein the memory system operations further comprise:

transitioning from the non-operational power state to the threshold power state based on the register; and transitioning, after transitioning to the threshold power state, from the threshold power state to the corresponding power state.

16. The user device of claim 11, wherein the controller operations further comprise:

receiving an operation during the non-operational power state for execution by the memory system at a corresponding power state; and transmitting a third command to the memory system to transition to the corresponding power state; and wherein the memory system operations further comprise:

receiving the third command from the controller;

transitioning from the non-operational power state to a previous power state corresponding to a previous power state record in the memory system; and transitioning, after transitioning to the previous power state, from the previous power state to the corresponding power state based on the third command.

17. The user device of claim 11, wherein the threshold power state is a mean power state of a plurality of power states.

* * * * *